United States Patent [19]

Tago et al.

[11] 4,105,510

[45] Aug. 8, 1978

[54] PROCESS FOR REMOVING WATER FROM WATER SOLUBLE POLYMER

[75] Inventors: Atsuo Tago; Ryoichi Yamanaka; Susumu Matsumoto, all of Kitakyushu, Japan

[73] Assignees: Kyoritsu Yuki Co., Ltd.; Mitsubishi Chemical Industries Ltd., both of Tokyo, Japan

[21] Appl. No.: 744,817

[22] Filed: Nov. 24, 1976

[30] Foreign Application Priority Data

Nov. 26, 1975 [JP] Japan ................................ 50-141267

[51] Int. Cl.$^2$ .............................................. C07B 5/00
[52] U.S. Cl. ........................................ 203/14; 203/65; 203/62; 203/8; 260/29.6 E; 528/493; 528/495; 528/501; 159/DIG. 10
[58] Field of Search .................... 203/8, 9, 14, 64, 65, 203/62; 260/29.6 E; 528/493, 495, 501; 159/DIG. 10

[56] References Cited

U.S. PATENT DOCUMENTS

| | | | |
|---|---|---|---|
| 2,435,777 | 2/1948 | Glavis | 260/29.6 E |
| 2,435,950 | 2/1948 | Neher | 260/29.6 E |
| 3,163,619 | 12/1964 | Sheats et al. | 260/29.6 E |
| 3,674,651 | 7/1972 | Otsuki et al. | 203/8 |
| 3,849,361 | 11/1974 | Zweigle | 260/29.6 E |
| 4,021,310 | 5/1977 | Kogyo | 203/8 |

*Primary Examiner*—Norman Yudkoff
*Attorney, Agent, or Firm*—Oblon, Fisher, Spivak, McClelland & Maier

[57] ABSTRACT

The invention relates to an improved process for removing water, under elevated temperature, from aqueous gel of water soluble polymer, such as polymer or copolymer of acrylamide and/or quaternary ammonium salts of dialkylaminoamlkylmethacrylate, to prevent from the deterioration of polymer properties. The process is accomplished by addition of polyhydric phenols, benzoquinones or derivatives thereof prior to removal of water.

12 Claims, No Drawings

PROCESS FOR REMOVING WATER FROM WATER SOLUBLE POLYMER

BACKGROUND OF THE INVENTION

The present invention relates to a process for removing water from an aqueous solution containing water soluble polymer. More particularly, the present invention relates to a process for recovering water soluble high molecular weight polymer from aqueous gel thereof without deterioration of properties.

Water soluble high molecular weight polymers, especially polymer or copolymer composed mainly of acrylamide, methacrylamide, quaternary ammonium salts of dialkylaminoalkyl acrylate or methacrylate have wide uses as flocculants for various waste waters, chemicals in paper making or textiles, and the like. These water soluble polymers are generally prepared by aqueous polymerization system, that is, polymerizing aqueous monomer solution or aqueous monomer solution emulsified with organic liquid and resulted polymer is dissolved in aqueous solution. Because the polymer solution is normally a viscous or rubbery mass, it is hereinafter termed gel or aqueous polymer gel. To prepare the powder of the polymer, it is necessary to remove water from aqueous polymer gel until the water content being below 10% by weight. Most available industrial methods for removing water from the aqueous polymer gel are heat drying method and azeotropic distillation method. (German Patent Publication No. 14 94 967)

But it had been found that the drying of the aqueous polymer gel by these methods had deleterious effect on the properties of the polymer especially solubility to the water which are important properties for flocculant is reduced. The deterioration formation increased when the polymer is treated under elevated temperature, for example, the temperature higher than 40° C. Inventors of the present invention found that it is useful to add some compounds when drying the aqueous polymer gel for preventing the deterioration of the polymer properties.

SUMMARY OF THE INVENTION

Therefore the object of the present invention is to provide a process for removing water from the aqueous gel of water soluble high molecular weight polymer without deteriorating the properties of the polymer.

This object has been achieved by removing water from the aqueous gel of the water soluble high molecular weight polymer containing, as major component repeating units shown by the formulae (1) and/or (2)

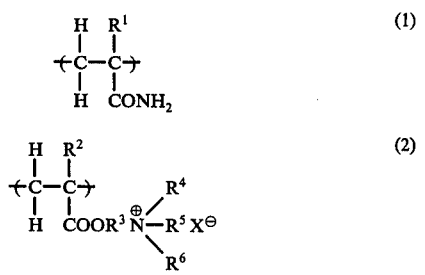

in the presence of at least one selected from the group consisting of polyhydric phenols, benzoquinones, and derivatives thereof.

In above formulae (1) and (2), $R^1$ and $R^2$ are hydrogen or methyl group, $R^3$ is an alkylene group having 1 to 3 carbon atoms; $R^4$, $R^5$ and $R^6$ are the same or different an alkyl groups having 1 to 3 carbon atoms or benzyl group, and $X^\ominus$ is an anion.

DETAILED DESCRIPTION OF THE INVENTION

The water soluble polymers of the object of the present invention have, as major component, repeating units shown by the afore-mentioned formulae (1) and/or (2). Such polymers are prepared by polymerizing unsaturated fatty acid amide shown by formula (1') and/or quaternary ammonium salts shown by the formula (2'), according to the known aqueous polymerization system.

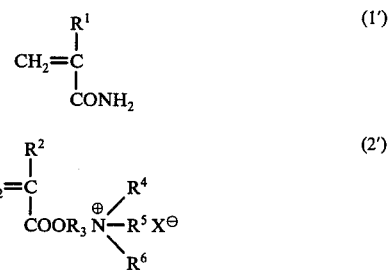

wherein $R^1$, $R^2$, $R^3$, $R^4$, $R^5$, $R^6$ and $X^\ominus$ have the same meaning as in formulae (1) and (2).

Unsaturated fatty acid amides of formula (1') include acrylamide and methacrylamide. Typical quaternary ammonium salts of formula (2') include acryloyloxyethyltrimethylammonium chloride, methacryloyloxyethyltrimethylammonium chloride, acryloyloxyethyltrimethylammonium methylsulfate, methacryloyloxyethyltrimethylammonium methylsulfate, methacryloyloxyethyltriethylammonium chloride, methacryloyloxyethyldimethylethylammonium chloride and the like. The water soluble polymers of the present invention may also contain the other ethylenically unsaturated monomer units as minor component. For example, copolymer of acrylamide and acrylic acid or its salt, or partially hydrolized polyacrylamide may be included. In any case, the minor components must be less than 40 mol % based on the all monomers which compose the polymer.

Any conventional method of aqueous polymerization system may be employed to prepare the aqueous polymer gel, that is, aqueous solution polymerization and aqueous emulsion polymerization. See U.S. Pat. No. 2,982,749. Japanese Patent Publication No. 15033/1962 etc.. Aqueous solution polymerization process are carried out by forming an aqueous solution containing less than 70%, preferably 10–50% by weight of monomer, adding polymerization initiator, and allowing the solution to stand at appropriate temperature, generally 40°–80° C.

Known radical polymerization initiator are employed, for example, peroxides such as potassium persulfate, ammonium persulfate, hydrogen peroxide, benzoyl peroxide; azo compounds such as azobisisobutylonitrile, 2,2'-azobis(2-amidinopropane)-hydrochloride. The amounts of initiator are 0.001–2% by weight to monomer. It is used, if desired, redox system initiator in combination of metal salt as sodium sulfite, tertiary amine as triethanolamine with an above mentioned peroxide. In case of using redox system initiator lower polymerization temperature may be employed. Thus, resulted products are aqueous polymer gel containing 50-90% by weight of water and 10-50% by weight of water soluble polymer.

In the aqueous emulsion polymerization, an aqueous solution containing less than 70%, preferably 30-60% by weight of the monomer is emulsified with an organic liquid by using emulsifier. The organic liquid includes chlorinated hydrocarbons such as dichloroethane, trichloroethylene; aliphatic or alicyclic hydrocarbons such as hexane, cyclohexane; and aromatic hydrocarbons such as benzene, xylene and the like. Resulted emulsion is allow to stand at appropriate temperature in the presence of suitable initiator as used in case of aqueous solution polymerization.

The ratio of the organic liquid to the aqueous monomer solution is usually in a range of 1-3 by weight.

Emulsifiers used in the emulsion polymerization include nonionic emulsifiers such as polyoxyethylene alkyl ether type, polyoxiethylene alkylphenol ether type, polyoxyethylene alkylester type, sorbitan alkylester type, polyoxyethylene alkylamide type or ordinary cationic or anionic emulsifiers. In accordance with the sort of emulsifiers, for example when using oil soluble emulsifier having HLB (hydrophilic-lipophilic balance) of 3.5-6, water-in-oil type emulsion is formed, and when using water soluble emulsifier having HLB of 8-18, oil-in-water type emulsion is formed. Amount of the emulsifier is generally 0.01-5% by weight to the emulsion. Thus, resultant is aqueous polymer gel dispersed or suspended in the organic liquid and upon separation of organic liquid by means of filtration and the like, aqueous polymer gel containing 40-70% water is obtained.

The present process is advantageous especially when removing water is carried under elevated temperature.

Known drying method, that is the heat drying methods and azeotropic distillation method (See aforesaid German Patent Publication), are employed to remove water from aqueous polymer gel. In the heat drying method, the aqueous polymer gel is heated at 60°-100° C by using appropriate means as hot air, under the atmospheric pressure or a reduced pressure. It is preferable to cut the polymer gel to form small particles or strand, prior to heating and if necessary drum dryer or other apparatus are employed.

In the azeotropic distillation, the aqueous polymer gel is dispersed into the organic liquid which forms azeotrope with water and non-solvent to the polymer, then the dispersion heated at azeotropic boiling point. Such organic liquids include toluene, xylene, cyclohexane, hexane, carbon tetrachloride, dichloroethane, trichloroethane and the like. When the aqueous polymer gel is prepared by emulsion polymerization, resulted reaction product may be, without separating aqueous polymer gel from the organic liquid, heated to distillation.

In accordance with the process of the invention, water is removed from the aqueous polymer gel in the presence of at least one additive selected from the group consisting of polyhydric phenols, benzoquinons and derivatives thereof. Such polyhydric phenols include catechol, resorcinol, pyrogallol and hydroquinone etc..

Benzoquinones include o-benzoquinone and p-benzoquinone. The derivatives include p-lower alkoxy phenols such as hydroquinone monomethyl ether, hydroquinone monoethyl ether and ortho- or metha-isomers thereof; water soluble dihydroxybenzene having lower alkyl group on benzene ring such as orcinol; water soluble benzoquinone having lower alkyl group on benzene ring such as o- methyl benzoquinone, p-ethyl benzoquinone and the like. The above mentioned lower alkyl or lower alkoxy group mean alkoxy or alkyl group having 1-3 carbon atoms.

An amounts of these additives are generally within the range of 0.005-4%, preferably 0.01-1.5% by weight to the polymer. The additives may be added either during polymerization reaction or during removal of water, but it is better to add them after polymerization and prior to removal of the water, since they cause inhibition of the polymerization reaction. Though the additives may be added in a form of powder or of aqueous solution, the latter is preferable for having the polymer gel contact homogeneous with additives.

The invention is further illustrated by following examples. These examples are preferred embodiments of the invention and not limit the scope of the invention.

In the examples, viscosity was measured as follows; polymer was dissolved in a 4% aqueous solution of sodium chloride to give a 0.5% by weight solution of the water soluble polymer, and the viscosity was measured at 25° C, using Ostward's viscometer. And '%' means 'percent by weight'.

EXAMPLE 1

A 45% aqueous monomer solution containing acrylamide and methacryloyloxyethyl trimethylammonium chloride in a molar ratio of 60:40 respectively, was mixed with 1.5 times as much as cyclohexane to form an emulsion.

Polyoxyethylene nonylphenyl ether (HLB = 12.9) was added as an emulsifier. 2,2'-azobis(2-amidinopropane)hydrochloride was used as a polymerization initiator.

Polymerization reaction was carried for 3 hours at a temperature of 45-60° C, then, cyclohexane was removed by filtration to obtain aqueous polymer gel which contained 55% of water. (viscosity of the polymer was 20 cp) 20 g of obtained aqueous polymer gel was charged in a flask, and was added 100 ml of cyclohexane to them. Then the flask was fitted up with a cyclohexane-water separator and a condenser, heated in the water bath whose temperature being maintained at 85°-90° C to distill off the water from the aqueous gel by azeotropic distillation for 5 hours.

This azeotropic distillation was repeated using various additives prior to the distillation. The amount of additives was 1% to the dried polymer.

The results of these tests were shown below in Table I. The solubility test was carried out by adding 0.2 g of dried polymer to 200 ml of desalted water and the mixture was stirred for 4 hours. Then amount of insoluble fraction was observed with the naked eye. The solubility was classified into 7 classes of 0-6 according to the amount of insoluble fraction. Solubility 0 meant no insoluble fraction and solubility 6 meant many insoluble fractions occurred, as when observed under "none" additive addition.

Table 1

| Additive | None | Hydroquinone | Resorcinol | Catechol | Pyrogallol | Hydroquinone monomethyl ether |
|---|---|---|---|---|---|---|
| Solubility | 6 | 1 | 2 | 0 | 0 | 2 |

EXAMPLE 2

The process of Example 1 was repeated except adding p- or o-benzoquinone. The results were shown in Table II.

Table II

| Additive | None | p-Benzo-quinone | o-Benzo-quinone |
|---|---|---|---|
| Solubility | 6 | 0 | 0 |

EXAMPLE 3

The aqueous polymer gel was prepared in a similar manner as Example 1, but after polymerization, to the resulted slurry of the aqueous polymer gel (viscosity of the polymer was 20 cp) was added catechol or p-benzoquinone, then water was distilled off by azeotropic distillation. Solubility of the resulted polymer were shown in Table III.

Table III

| | | Solubility | |
|---|---|---|---|
| Amount | Additive | Catechol | p-Benzoquinone |
| None | | 6 | 6 |
| 0.001% | | 5 | 6 |
| 0.005% | | 1 | 1 |
| 0.01% | | 0 | 0 |
| 0.5% | | 0 | 0 |

It was clear from the Table III, more than 0.005% addition was preferable.

EXAMPLE 4

The mixture of acrylamide and methacryloyloxyethyltrimethylammonium chloride in a molar ratio of 60:40 respectively was dissolved in water to form 40% aqueous solution. Copolymerization was carried out for 3 hours in a bath whose temperature being 50°–60° C, by using 2,2'-azobis(2-amidinopropane)hydrochloride, as an polymerization initiator. Resulted aqueous gel of copolymer containing 60% water was crushed into small particles. 20 g of polymer particles were charged in a plate, and the plate was stood in the thermostat dryer maintained at 85°–90° C for 8 hours to remove the water. Various additives were added to polymer particles prior to charging in the dryer. Solubility of dried polymer were shown in Table IV.

Table IV

| Additive | None | Hydroquinone | Catechol | Pyrogallol | p-Benzoquinone | Hydroquinone monomethyl ether |
|---|---|---|---|---|---|---|
| Solubility | 6 | 2 | 0 | 0 | 0 | 2 |

EXAMPLE 5

In a 10 litre stainless steel reactor 2,950 g of cyclohexane and 87 g of polyoxyethylene nonylphenyl ether (HLB = 10.9) were charged. A solution of 870 g of acrylamide in 1,300 g of water was added to the reactor to form emulsion.

The reactor was heated to 60° C under introducing nitrogen gas, then polymerization was started by adding 17.4 g of 0.5% aqueous solution of ammonium persulfate and was continued for 30 minutes. To the resulted slurry of aqueous polymer gel, 87 g of 10% aqueous solution of catechol was added (1% to the dried polymer), then water was removed by azeotropic distillation.

The solubility, viscosity and flocculation ability for a waste water of pulp were shown in Table V.

Table V

| | None | Catechol (1%) |
|---|---|---|
| Solubility | 6 | 1 |
| Viscosity | 100 cp | 120 cp |
| Flocculation ability* | | |
| pH 4.5 | 1 mm | 3 mm |
| pH 5.5 | 2 mm | 4 mm |
| pH 6.5 | 2 mm | 3 mm |

It is clear from the Table V that the solubility, viscosity and flocculation ability are increased by addition of catechol.

What is claimed is:

1. A process for removing water and producing a dry polymer from an aqueous gel of a high molecular weight water soluble polymer having, as major components, repeating units shown in formulae (1) and/or (2)

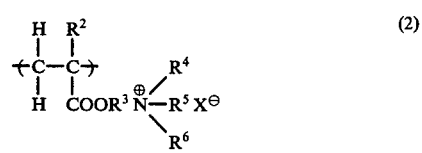

wherein $R^1$ and $R^2$ denote hydrogen or methyl group, $R^3$ denotes an alkylene group having 1–3 carbon atoms, $R^4$, $R^5$ and $R^6$ denote the same or different lower alkyl group having 1–3 carbon atoms or benzyl group, and $X^\ominus$ denotes an anion; which comprises removing water from the aqueous gel of said polymer in the presence of at least one water soluble substance selected from the group consisting of water soluble polyhydric phenols, benzoquinones and derivatives thereof until a dry polymer is obtained.

2. A process according to claim 1, wherein the aqueous polymer gel is prepared by polymerization of unsaturated fatty acid amide of formula (3)

and quaternary ammonium salt of formula (4)

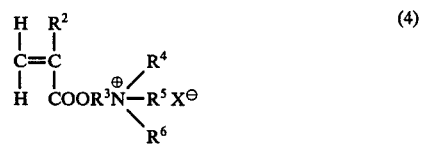

wherein $R^1$ and $R^2$ denote hydrogen or methyl group, $R^3$ denotes an alkylene group having 1–3 carbon atoms, $R^4$, $R^5$ and $R^6$ denote the same or different lower alkyl group having 1–3 carbon atoms or benzyl group, and $X^\ominus$ denotes an anion;

in aqueous medium.

3. A process according to claim 2, wherein the aqueous polymer gel is prepared by polymerization of acrylamide and methacryloyloxyethyl trimethylammonium chloride.

4. A process according to claim 1, wherein the aqueous polymer gel is prepared by polymerization of quaternary ammonium salt of formula

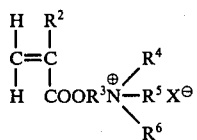

wherein $R^1$ and $R^2$ denote hydrogen or methyl group, $R^3$ denotes an alkylene group having 1-3 carbon atoms, $R^4$, $R^5$ and $R^6$ denote the same or different lower alkyl group having 1-3 carbon atoms or benzyl group, and $X^\ominus$ denotes an anion.

5. A process according to claim 1, wherein removing water is carried out under elevated temperature.

6. A process according to claim 5, wherein water is removed from the aqueous polymer gel in the presence of polyhydric phenol selected from catechol, resorcinol, hydroquinone and pyrogallol.

7. A process according to claim 6, wherein polyhydric phenol is catechol.

8. A process according to claim 6, wherein polyhydric phenol is pyrogallol.

9. A process according to claim 5, wherein water is removed from the aqueous polymer gel in the presence of benzoquinone.

10. A process according to claim 5, wherein water is removed from the aqueous polymer gel by heat drying method.

11. A process according to claim 5, wherein water is removed from the aqueous polymer gel by azeotropic distillation.

12. The process of claim 5, wherein the water soluble substance is a derivative of a polyhydric phenol or a benzoquinone which is a water soluble dihydroxy benzene having a lower alkyl group on the benzene ring, a lower alkoxy phenol or a benzoquinone having a lower alkyl group on a benzene ring.

* * * * *